(12) United States Patent
Roberts

(10) Patent No.: US 7,770,379 B2
(45) Date of Patent: Aug. 10, 2010

(54) APPARATUS FOR MOVING ROTATABLE COMPONENTS

(75) Inventor: Michael C. Roberts, Bristol (GB)

(73) Assignee: Rolls-Royce PLC, London (GB)

( * ) Notice: Subject to any disclaimer, the term of this patent is extended or adjusted under 35 U.S.C. 154(b) by 889 days.

(21) Appl. No.: 11/521,498

(22) Filed: Sep. 15, 2006

(65) Prior Publication Data

US 2007/0081754 A1 Apr. 12, 2007

(30) Foreign Application Priority Data

Oct. 12, 2005 (GB) ................... 0520701.4

(51) Int. Cl.
*F02K 1/00* (2006.01)
(52) U.S. Cl. .......................... 60/232; 60/228
(58) Field of Classification Search ............... 60/228, 60/229, 232, 770; 239/265.19, 265.35; 91/210; 92/54

See application file for complete search history.

(56) References Cited

U.S. PATENT DOCUMENTS

| | | | | |
|---|---|---|---|---|
| 3,443,758 A | * | 5/1969 | Kopp et al. | 239/265.35 |
| 4,679,732 A | * | 7/1987 | Woodward | 239/265.35 |
| 5,438,912 A | | 8/1995 | Tonsor | |
| 5,478,016 A | * | 12/1995 | Mansfield | 239/265.19 |
| 5,811,657 A | | 9/1998 | Fagerdahl | |

FOREIGN PATENT DOCUMENTS

FR 2572473 A1 5/1986
JP A 63-203215 8/1988

* cited by examiner

*Primary Examiner*—Michael Cuff
*Assistant Examiner*—Vikansha S Dwivedi
(74) *Attorney, Agent, or Firm*—Oliff & Berridge, PLC

(57) ABSTRACT

The present invention provides an actuating apparatus for moving relatively rotatable components. In one embodiment the apparatus comprises: a bearing (30) including first (34) and second (36) relatively rotatable bearing elements for mounting respective first (18) and second (12) rotatable components for relative rotation about a common axis; a pneumatic or hydraulic actuator having a pair of co-acting parts (44, 54), including a first part (54) fixed with respect to the said first rotatable element and a second part (44) fixed with respect to the said second rotatable element; and, means (110) for energising and/or de-energising said actuator means to effect movement of the said co-acting parts and thereby relative rotation of the said first and second bearing elements about the said bearing axis. The actuator may comprise at least one chamber (52) defined between a pair of relatively rotatable annular members (44, 54) each having at least one dividing element (66, 68, 70) extending into the chamber to divide the interior of the chamber into separate circumferential regions (80, 82, 84). Pressure differentials generated in the chamber across one or more of the dividing elements effect relative rotation of the first and second bearing elements.

16 Claims, 7 Drawing Sheets

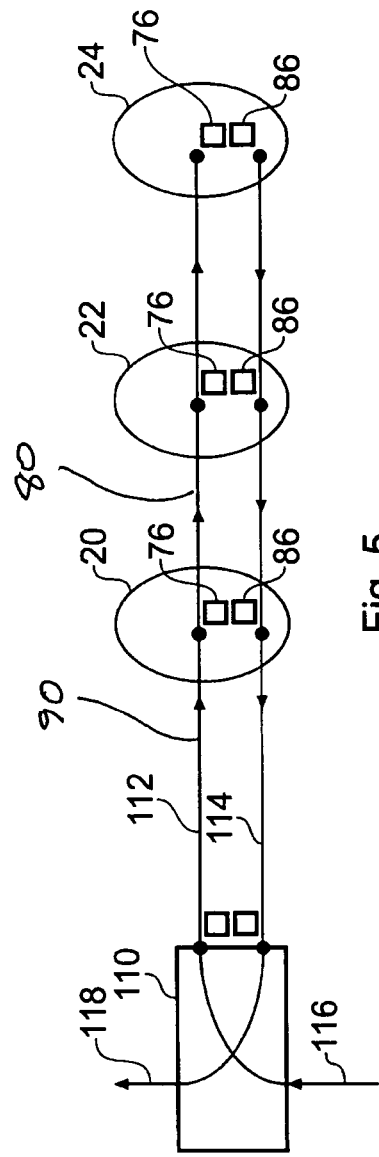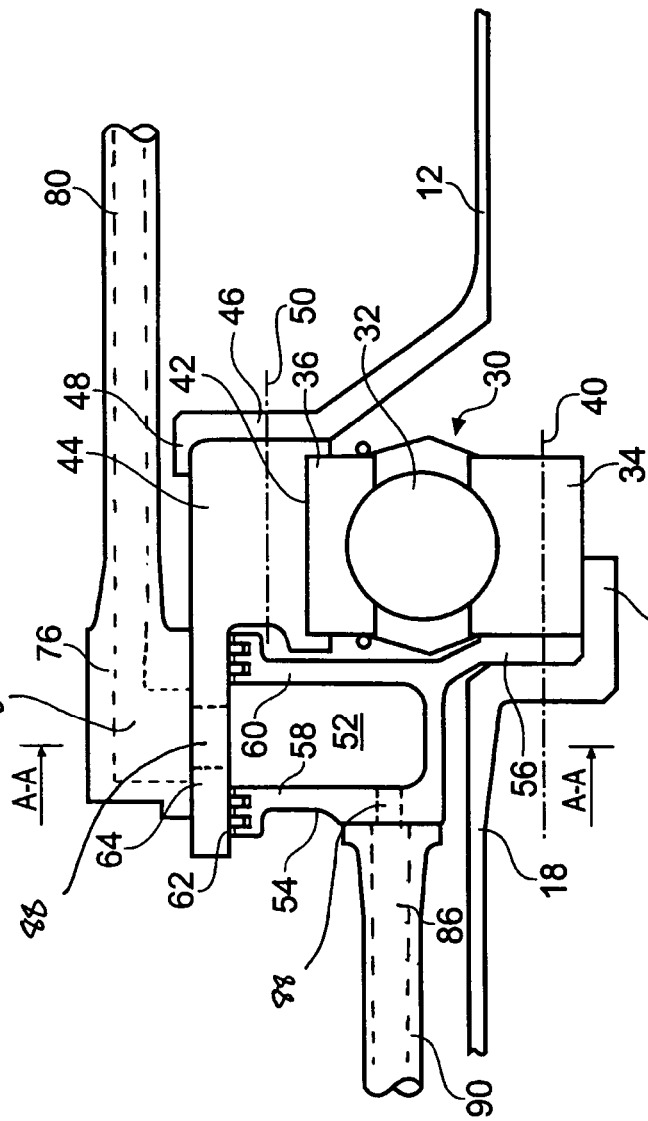

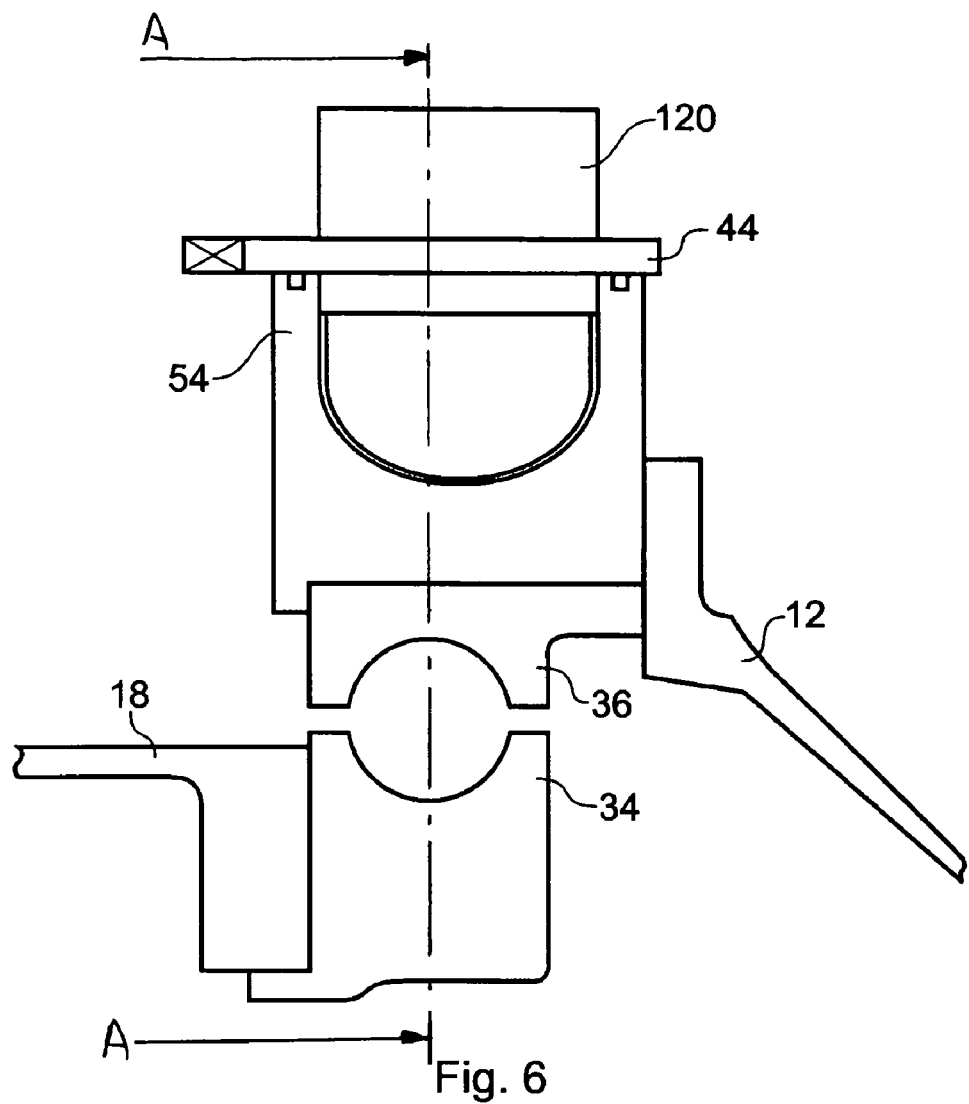
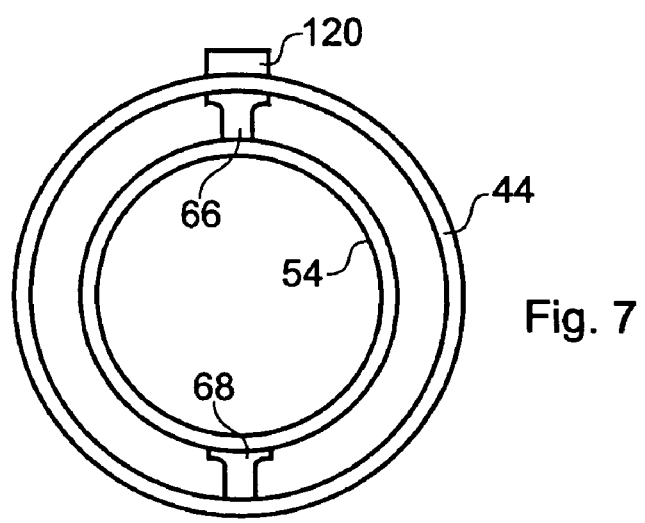
Fig. 6
Fig. 7

APPARATUS FOR MOVING ROTATABLE COMPONENTS

This invention relates to apparatus for moving at least two relatively rotatable components about a common axis of rotation.

In particular the invention concerns a pneumatic or hydraulic actuator for moving sections of a gas turbine engine vectorable nozzle for thrust vectoring.

The present invention finds particular application in the field of gas turbine engine thrust vectoring nozzles such as the three bearing swivel nozzle for vertical and short take off and landing aircraft recently developed by Rolls-Royce.

The Rolls-Royce three bearing swivel nozzle is a gas turbine engine exhaust nozzle that is capable of vectoring engine thrust. The nozzle is in the form of an oval duct divided into three adjacent sections at respective scarfed planes, angled at +/−65° to the notional duct axis. Each nozzle section comprises an upstream and a downstream annular flange which are joined together by the wall of the duct. The nozzle sections are rotatably mounted with respect to each other by rolling element bearings at their respective adjoining flanged ends such that when contra-rotated they redirect the jet efflux, and hence engine thrust, between the horizontal (axial) and vertical directions. In a known arrangement each duct section is rotatably mounted to a neighbouring section by a bearing arrangement comprising an inner track or race, an outer track or race, a plurality of spherical rolling elements, two so called 'belly bands' to control diametrical clearance in the bearing, and two grease shields. Rotation is performed by an actuator (jack), pinion and ring gear arrangement where the ring gear is splined with respect to the bearing. The nozzle comprises three bearings, one for mounting each duct with respect to its neighbour. The three bearing arrangement reduces duct ovality by increasing scarf angle in the plane of the bearing rings, which must be circular. However this is at the expense of increased weight and complexity when compared to a two bearing arrangement, that is to say a nozzle having only two relatively rotatable sections.

Although the present invention finds particular application in the field of vectorable nozzles for aircrafts including manned and unmanned air vehicles, it is to be understood that the invention may be applied whenever there is a requirement for moving one rotatable component with respect to another, for example in the hydraulic or pneumatic actuation of wind generator masts, gun turrets, motor vehicle steering columns, etc.

There is a requirement for an improved actuator arrangement for effecting rotation of relatively rotatable parts such as adjacent sections in gas turbine engine nozzle arrangements of the aforementioned type. In particular there is a requirement for a lightweight actuator arrangement suitable for aircraft applications.

According to an aspect of the present invention there is provided apparatus comprising: bearing means including first and second relatively rotatable bearing elements for mounting respective first and second rotatable components for relative rotation about a common axis; pneumatic or hydraulic actuator means having a pair of co-acting parts, including a first part fixed with respect to the said first rotatable element and a second part fixed with respect to the said second rotatable element; and, means for energising and/or de-energising said actuator means to effect movement of the said co-acting parts and thereby relative rotation of the said first and second bearing elements about the said bearing axis wherein the said actuator means comprises at least one chamber defined between a pair of relatively rotatable annular members each having at least one dividing element extending into the chamber to divide the interior of the chamber into separate circumferential regions, a first of the said annular members being fixed with respect to the said first bearing element and a second of the said annular members being fixed with respect to the said second element, and means for generating a pressure differential in said chamber across one or more of the said dividing elements to effect said relative rotation of the said first and second bearing elements.

This aspect of the invention provides a lightweight actuator arrangement having a relatively simple construction comprising fewer components than the hitherto known arrangements, leading to reduced cost, reduced weight and improved reliability. In this embodiment pressurisation of part of the divided chamber causes the chamber to expand, in the sense that the dividing elements of the first and second annular members are forced apart by the pressure differential generated across the elements. In this respect the dividing elements may be considered to act as pistons in the sense that they are caused to move relative to each other by the pressurised fluid in the region of the chamber bounded by the dividing elements.

In one preferred embodiment the first and second annular members each comprise a single dividing element. In other preferred embodiments the first annular member comprises a pair of circumferentially spaced dividing elements whereas the second annular member comprises a single dividing element. In the former embodiment the chamber is divided into two circumferential regions whereas in the latter embodiment the chamber is divided into three regions. This arrangement readily enables the different circumferential regions divided by the dividing elements to be selectively pressurised or vented in accordance with the desired rotation of the two components. In the latter embodiment the single dividing element of the second annular member may be moved, relatively, between the two dividing elements of the first annular member. Preferably the two dividing elements of the first annular member are diametrically opposed or slightly offset from this configuration so that the single dividing element on the other annular member may be moved through substantially 180° between the dividing elements of the first annular member. Selective pressurisation of the respective regions of the chamber enable the first and second annular members to be rotated through substantially 360° with respect to each other.

The actuator apparatus preferably comprises a plurality of inlet/outlet ports for delivering and/or venting pressurised fluid to/from a selective circumferential region or regions of the chamber. In this way it is possible to more readily control the relative rotation of the components by selective pressurisation and venting of the regions of the chamber.

In a preferred embodiment the ports are each located adjacent to and in fixed relation to a respective dividing element such that pressurised fluid is capable of being delivered and/or vented from each of the regions of the chamber independently of the relative rotational position of the dividing elements. Preferably, this is achieved in arrangements where the ports are provided in the first and second annular members. This provides a relatively compact and simple arrangement, particularly in embodiments where the chamber is defined, almost entirely, by the first and second annular members.

In one preferred embodiment the chamber is defined by an open channel in one of the annular members and an annular cover part, covering the open channel, of the other of the annular members. In this way it is possible to provide a simple and effective seal between the channel and the cover part to seal the chamber at the interface of the channel and the cover.

In preferred embodiments this may be achieved by means of piston rings or the like located in grooves in the region of the channel.

The divided circumferential regions of the chamber are also preferably sealed with respect to each other. In a preferred embodiment the dividing elements are each provided with a tip seal for sealing engagement with an adjacent surface of the chamber.

In one embodiment the said actuator means comprises at least one circumferentially extending piston chamber having a movable piston disposed therein, the chamber being fixed with respect to one of the bearing elements and the piston being fixed with respect to the other of the bearing elements. This embodiment provides a relatively simple arrangement in which a circumferentially extending piston/cylinder type actuator is provided in the region of the bearing elements to effect relative rotation of those elements by movement of the piston within the cylinder.

In preferred embodiments the piston is of the double-acting type, that is to say is capable of being driven in either a forward or reverse direction within its cylinder.

In preferred embodiments the actuator comprises a pair of piston chambers arranged for rotating the rotatable bearing elements in respective forward and reverse directions. The two piston chambers readily enables the bearing elements to be rotated by 180° or more.

Preferably the apparatus further comprises control means for controlling the absolute and relative rotational velocities of the rotatable elements. In one preferred embodiment the control means comprises a means for measuring the rotational velocities of the rotatable components and may further comprise a braking means for controlling the rotational velocities of the respective parts. In preferred embodiments the braking means comprises a phonic wheel and solenoid controlled brakes to provide fine control of the relative rotational speeds, with coarse control being provided by means of a switch valve for switching the delivery of pressurised fluid to the various inlet/outlet ports.

In a preferred embodiment the bearing means comprises a rolling element type bearing having an inner race and an outer race which comprise the aforementioned first and second rotatable bearing elements. This readily enables the bearing elements to be fixed with respect to respective adjacent duct sections such that the inner race is fixed in relation the first duct section and the outer race is fixed in relation to a second adjacent duct section.

Preferably, the duct sections comprise relatively rotatable nozzle sections of a gas turbine engine vectorable nozzle. In particular, the aforementioned aspect of the invention is particularly suitable for implementation in a three bearing nozzle arrangement of the aforementioned type.

In preferred embodiments the means for energising and de-energising the actuator comprises a pneumatic or hydraulic circuit comprising a valve for reversing the direction of the pressure differential in the circuit. This provides for a relatively simple pneumatic or hydraulic circuit particularly in embodiments where the same circuit is used to control a plurality of relatively rotatable components, for example in a three bearing nozzle arrangement where relative rotation of all three sections of the nozzle requires coordinated control. This can be readily achieved where a common pneumatic or hydraulic circuit is used for controlling each of the nozzle sections, that is to say by linking all the inlet parts together and similarly all the outlet ports.

According to a further aspect of the invention there is provided a vectorable nozzle for a gas turbine engine comprising apparatus according to the abovementioned aspect of the invention. The vectorable nozzle preferably comprises at least three relatively rotatable nozzle duct sections, for example the nozzle may be considered to be a three bearing nozzle. In alternative embodiments the invention also contemplates vectorable nozzles having only two relatively rotatable nozzle duct sections, for example an embodiment where the scarfed nozzle plane between the adjacent sections is 45° or thereabouts depending on the range of vector angles required.

According to another aspect of the invention there is provided apparatus for moving at least two relatively rotatable elements with respect to each other about a common axis of rotation, the said apparatus comprising at least one circumferentially extending chamber having a movable piston disposed therein, at least part of the said chamber being fixed with respect to a first rotatable element and the said piston being fixed with respect to a second element rotatable with respect to the first element, and means for generating a pressure differential across the said piston to effect movement of the piston in the chamber and thereby relative rotation of the said first and second elements about a common axis.

According to further aspect of the invention there is provided apparatus for moving at least two relatively rotatable elements about a common axis of rotation, the said apparatus comprising at least one chamber defined between a pair of relatively rotatable annular members each having at least one dividing element extending into the chamber to divide the interior of the chamber into separate circumferential regions, a first of the said annular members being fixed with respect to a first element and a second of the said members being fixed with respect to a second element rotatable with respect to the first element, and means for generating a pressure differential in said chamber across one or more of the said dividing elements to effect relative rotation of the said first and second elements about a common axis.

Various embodiments of the invention will now be more particularly described, by way of example only, with reference to the accompanying drawings, in which:

FIG. 2 is an axi-symmetric view of a bearing ring and associated actuator between two of the duct sections of the nozzle arrangement of FIG. 1;

FIG. 5 is a schematic representation of a pneumatic circuit for actuating the bearing rings of a three bearing nozzle;

FIG. 6 is an axi-symmetric view similar to FIG. 2 which shows a bearing ring and actuator arrangement according to a second embodiment of the invention;

FIG. 7 is a cross-section view similar to FIG. 3 along the line B-B of FIG. 6;

Figure 1:
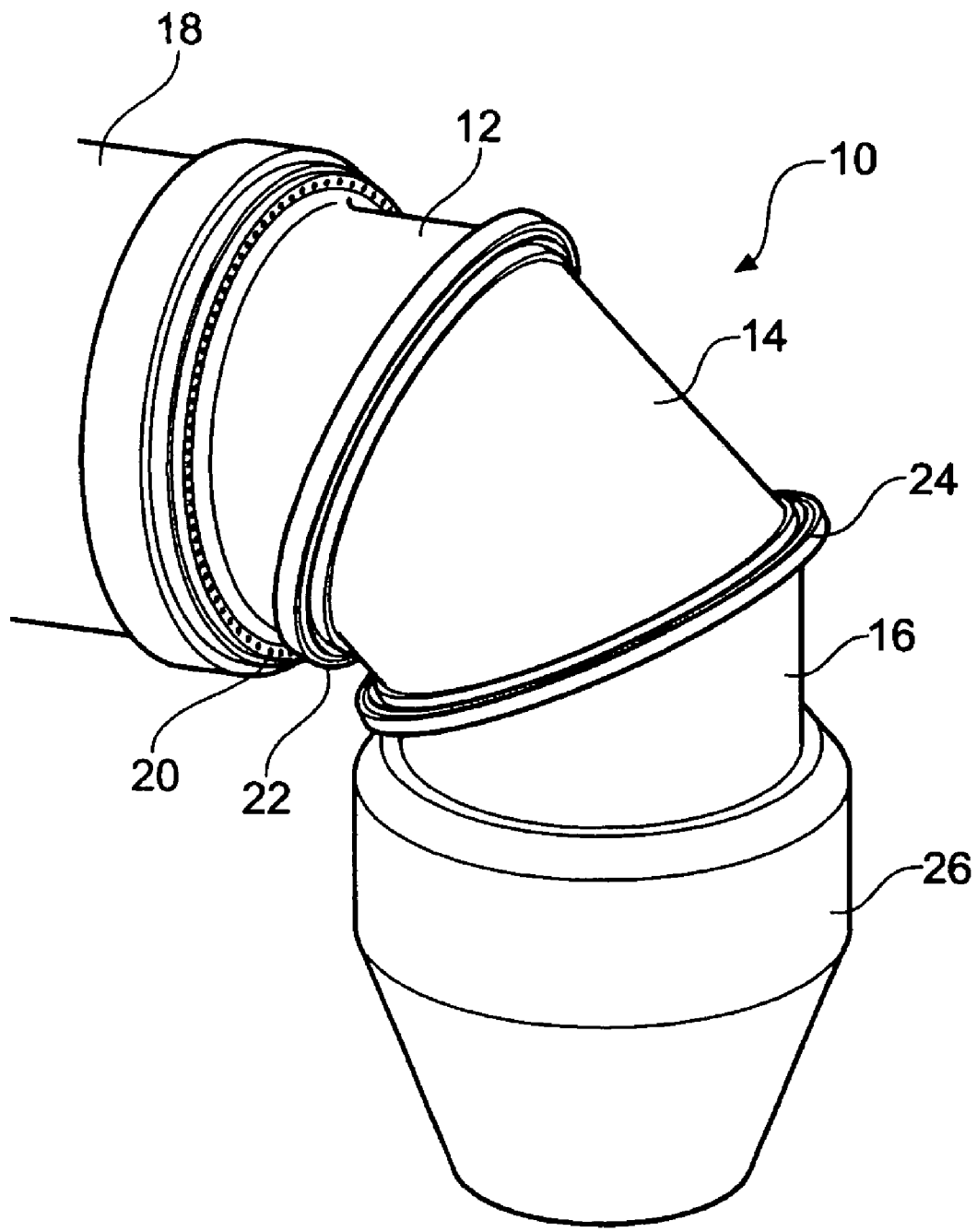
FIG. 1 is a perspective view of a three bearing nozzle arrangement.

With reference to FIG. 1, there is shown a three bearing swivel nozzle 10 for vectoring the jet efflux of an aircraft mounted gas turbine engine. The nozzle comprises three adjacent duct sections 12, 14 and 16. The first, or upstream, duct section 12 is rotatably mounted to a final engine duct section 18 by means of a bearing ring assembly 20 positioned between the duct 18 and the nozzle section 12. The second, or mid, nozzle section 14 is rotatably mounted at its upstream end to the downstream end of the first nozzle section 12 by means of a bearing ring assembly 22 and at its downstream end to the third, or downstream, nozzle section 16 by means of a bearing ring assembly 24. The nozzle section 16 is fixed to a final nozzle outlet section 26 having a variable exit area.

The inlet and exit planes of each of the three nozzle sections 12, 14 and 16 are inclined with respect to each other. In an axial configuration the nozzle sections 12, 14 and 16 define a cylindrical duct divided into the three sections at the respective inclined planes of the bearing rings, which in this embodiment are angled at +/−65° to the notional duct axis. This arrangement enables the duct sections to be contra-rotated to the configuration shown in the drawing where the duct sections form a bend of substantially 90° for redirecting the jet efflux, and hence engine thrust downwards.

The bearing rings will now be described in more detail below with reference to FIGS. 2 to 9. In the description that follows only one of the bearing rings is described in detail but it will be understood that all three bearing rings are substantially identical with only minor differences existing between the three rings.

Referring to FIG. 2 which shows an axi-symmetric view of the bearing ring 20 at the upstream end of the nozzle 10. The bearing ring assembly 20 comprises a rolling element bearing 30 positioned between the final engine duct 18 and the upstream end of the first nozzle section 12. The bearing 30 in the illustrated embodiment comprises a plurality of spherical ball rolling elements 32 located between respective inner and outer bearing races 34 and 36. The downstream end of the engine duct 18 is stepped to provide a reduced diameter end portion 38 which defines a spigot which locates the inner race 34 of the bearing 30. The inner race 34 is secured to the stepped flange 38 by a plurality of circumferentially spaced bolts (not shown), the bolt axial centre line being indicated by the chain dot line 40 in the drawing of FIG. 2. The outer race 36 is located by means of an interference fit in a shallow circumferential groove 42 provided in the radially inward facing surface of an annular torque ring member 44 which is secured to the radially outer part of an annular flange 46 at the upstream end of the duct 12. A spigot 48 extends from the radially outer most part of the flange 46 and extends for a short axial distance around the outer circumference of and at the downstream end of the torque ring 44 to locate the duct 12 with respect to the torque ring 44. The annular torque ring member 44 is secured to the annular flange 46 by a plurality of circumferentially spaced bolts (not shown), as indicated by the chain dot bolt centre line 50 in the drawing of FIG. 2.

The bearing ring 20 further comprises a pneumatic actuation system for moving the nozzle section 12 with respect to the engine duct section 18 about the bearing axis. The pneumatic actuation system comprises a circumferentially extending chamber 52 which is defined in part by a U-shape circumferentially extending channel provided in an annular channel ring element 54 disposed axially adjacent to the bearing 30 on the upstream side thereof. The channel ring 54 is disposed coaxially with respect to the bearing and includes a radially inwardly projecting annular flange 56 which is bolted between the inner race 34 and the stepped flange 38 of the duct 18 such that the channel ring is fixed in relation to the inner race and final engine duct section. The U-shape channel is defined between a pair of axially spaced annular side walls 58 and 60, the radially outermost parts of which are each provided with a pair of piston ring grooves for receiving piston ring seal elements 62 for sealing the circumferential channel against the radially inner surface of an upstream axially extending portion 64 of the torque ring 44. The radial clearance between the channel ring 54 and the torque ring 44 is relatively small in order to minimise leakage through the seals 62. The sealed channel 52 defines a chamber for receiving pressurised fluid, preferably compressor delivery air, via a pneumatic circuit described in greater detail below.

Figure 3:
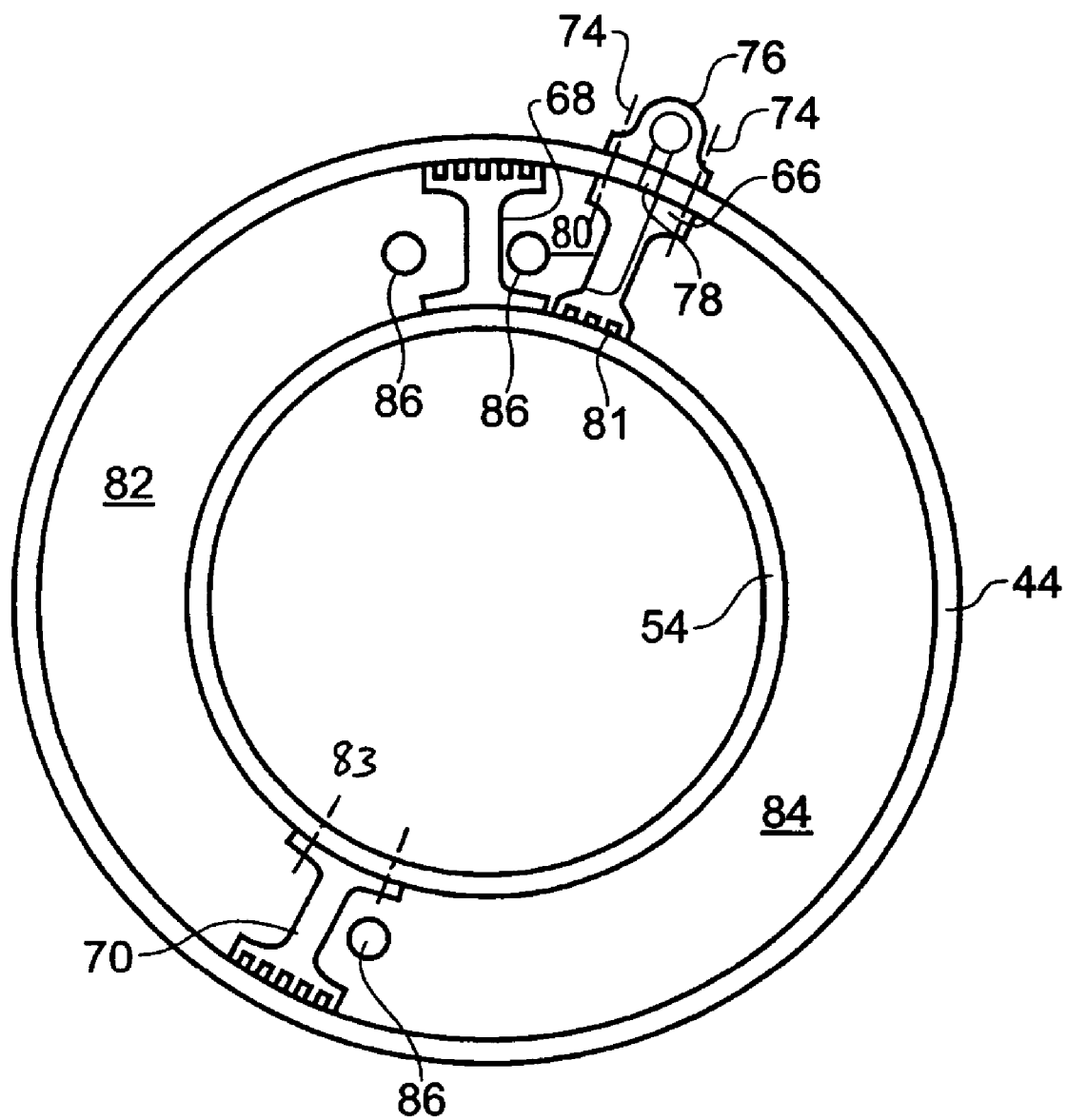
FIG. 3 is a cross-sectional view along line A-A of FIG. 2.

Referring now to the drawing of FIG. 3, the circumferential chamber 52 is divided into separate circumferential regions by means of a plurality of radially extending dividing elements 66, 68 and 70. The cross-section of the dividing elements in the circumferential direction of the chamber 52 is substantially the same as that of the annular chamber in order to minimise leakage of pressurised air across the elements in use.

The dividing elements each have a generally I-shape cross-section in the plane perpendicular to the axial direction of the bearing ring. A first of the dividing elements 66 is fixed to the extension portion 64 of the torque ring by bolts (not shown) which pass through the radially outer flange of the dividing element and the torque ring 44. These bolts, indicated by chain dot bolt centre lines 74 in the drawing of FIG. 3, also secure a pneumatic adapter 76 to the torque ring at the same angular position as the dividing element 66. The pneumatic adapter 76 comprises an internal passageway which is aligned with an aperture 78 in the extension part 64 of the torque ring so that pressurised air can be delivered into the circumferential region of the chamber 52 on one side of the dividing element 66 and vented therefrom. The adaptor is connected to an air transfer tube 80 (FIG. 2) for delivering high pressure compressor delivery air into the chamber or venting the chamber depending on the direction of the pneumatic circuit during actuation of the duct sections. The tip of the dividing element 66 adjacent to the base part and the side walls 58, 60 of the U-shape channel 52 is provided with a plurality of U-shape axially extending grooves 81 for receiving axially extending seal elements for sealing engagement with the base of the U-shape channel.

The second and third dividing elements 68 and 70 are secured to the base of the U-shaped channel in the channel ring 54 by a pair of bolts (not shown) which extend through the radially inner flange portion of the elements and the U-shape part of the channel ring, as indicated by the chain-dot bolt centre lines 83 in the drawing of FIG. 3. The opposite, radially outer, flange of the respective elements 68 and 70 is provided with a plurality of axially extending U-shape grooves for receiving axially extending seal elements for sealing the tips of the dividing elements against the radially inward facing surface of the axial extension part 64 of the torque ring 44.

As can be seen in the drawing of FIG. 3 the three dividing elements 66, 68 and 70 divide the circumferential chamber 52 into three circumferential regions, including a first region 80 between the first and second dividing elements, a second region 82 between the second and third dividing elements and a third region 84 between the first and third dividing elements.

A plurality of pneumatic adaptors 86 are provided at various circumferentially spaced locations around the channel ring 54. The adaptors 86 are similar to the adaptor 76 in that they each define an inlet/outlet port for conveying pressurised air into the respective circumferential regions of the chamber/or and venting low pressure air therefrom. A pair of pneumatic adaptors 86 are positioned in the region of the second dividing element 68. These adaptors are aligned with apertures 88 provided in the wall 58 of the channel ring. In the illustrated embodiment one port 88 is provided on each side of the dividing element 68 immediately adjacent thereto. The third dividing element 70 is provided with a single inlet/outlet port 88 on the side of the element defined by region 84. The ports 88 are located immediately adjacent the respective dividing elements so that they are capable of delivering pressurised fluid to the respective regions 80, 82 and 84, or venting low pressure air therefrom, for all relative positions of the dividing elements within the chamber 52 without being obstructed by the dividing elements or any other part of the bearing ring assembly. As can be seen in the drawing of FIG. 2 each of the adaptors 86 mounted on the channel ring 54 are connected to a respective pneumatic pipe 90 for communicating high pressure compressor delivery air to the respective circumferential regions of the chamber or for venting lower pressure air therefrom.

Figure 4:
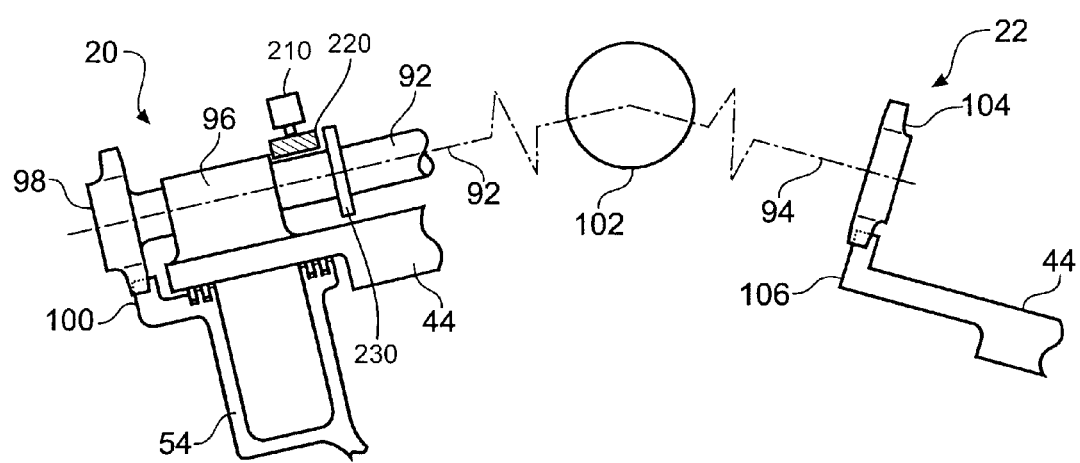
FIG. 4 is a schematic view of a mechanical arrangement between respective bearing rings in a three bearing nozzle arrangement of the type shown in FIG. 1.

In order to control the absolute and relative rotational velocities of the respective duct sections 12, 14 and 16 the bearing ring assemblies 20, 22 and 24 may be interconnected as shown in the arrangement of FIGS. 1 and 4. In FIG. 4 only selective parts of the first and second bearing ring assembly are shown. The first and second bearing ring assemblies are connected by respective actuator shafts, indicated by chain dot lines 92 and 94 in the drawing of FIG. 4. Shaft 92, shown in part, is supported in a journal bearing housing 96 extending from the radially outer surface of the torque ring 44 of the first bearing assembly 20 on the axially extending part 64 thereof. A pinion gear wheel 98 is connected to the end of the shaft 92 and extends beyond the end of the torque ring to mesh with corresponding gear teeth on an outer gear 100 connected to the channel ring 54 of the first bearing ring assembly. The outer gear ring is positioned at the radially outer end of the annular wall element 58 immediately adjacent the circumferential seals 62 at the radially outer part of the channel ring. The other end of the shaft 92 is connected to the shaft 94 through a constant velocity joint, indicated schematically at 102 in the drawing. The other end of shaft 94 is similarly provided with a pinion gear wheel 104 which meshes with teeth of an outer gear 106 provided at the upstream end of the torque ring 44 of the second bearing ring assembly. Although not shown in the drawing, a similar arrangement may be provided for mechanically connecting the second and third bearing ring assemblies 22 and 24. In an arrangement of the type shown in FIG. 4 a braking means may be provided on the respective shafts for monitoring and controlling the speed of the rotation of the shafts using phonic wheels 230 and solenoid 210 controlled brakes 220 (shown in FIG. 4). Coarse control of the shaft velocities may be provided by a switch valve arrangement described below with reference to FIG. 5.

FIG. 5 shows a schematic layout for a pneumatic circuit for pneumatically actuating the respective bearing ring assemblies. The circuit comprises a switch valve 110 which is connected via a first pneumatic line 112 to the pneumatic inlet/outlet adaptor apertures 76, 78 of the first, second and third bearing ring assemblies. A second pneumatic line 114 connects the switch valve to the respective inlet/outlet adaptor ports 86, 88 located on the channel rings 54 of the respective first, second and third bearing ring assemblies. The switch valve further comprises an inlet port 116 for receiving high pressure delivery air from the gas turbine engine compressor and an outlet port 118 for venting low pressure air from the unpressurised regions of the chambers 52.

In use, compressed air from the engine compressor enters the switch valve through the inlet port 116 and is delivered to the first pneumatic line 112. In the first bearing ring assembly high pressure air enters into the first region 80 of the pneumatic chamber 52 through the adaptor 86 and aperture 88 in the side wall of the channel ring which opens into the region 80 of the chamber. The high pressure air entering the chamber 80 creates a pressure load on the dividing elements and causes the torque ring 44 to rotate, in the clockwise direction shown in FIG. 3, relative to the channel ring 54. The load that is created on the torque ring by the pressurised air is reacted through the bearing 30. The torque ring has sufficient circumferential stiffness to prevent local distortion due to the air pressure in the chamber 80 to prevent leakage between the torque ring and the channel ring seals 62. Compressed air is delivered to the second and third bearing ring assemblies from the first bearing ring from the torque ring adaptor 76 and associated aperture 78 and transfer tube 80. As the first dividing element 66 rotates relative to the second element 68 the region 80 between the dividing elements expands and air on the other side of the first dividing element in the circumferential region 84 is evacuated through the vent provided by the aperture 88, adaptor 86 and air transfer tube 90 adjacent to the third dividing element. The first dividing element 66 moves within the chamber 52 towards the third element 70 and thus in the illustrated embodiment is capable of moving through about 180° with respect to the carrier ring and the second and third dividing elements fixed thereto. It is to be understood that in alternative embodiments the bearing ring assembly may only be provided with the first and second dividing elements such that the first element may be moved through the chamber through almost 360° from one side of the second element to the other side. An example of such an embodiment is described below with reference to FIGS. 6 and 7.

The switch valve enables the pneumatic circuit to be reversed so that the relatively rotatable components may be moved with respect to each other in the opposite direction to that previously described. By connecting the compressor delivery air to the pneumatic line 114 and the outlet vent to pneumatic line 112 the direction of rotation can be reversed such that the nozzle sections can be moved from the configuration shown in FIG. 1 to a more conventional configuration in which they are aligned to form a generally cylindrical axial duct for forward wing borne flight of the aircraft.

A second embodiment of the invention is illustrated in the drawings of FIGS. 6 and 7. The second embodiment is similar to the first embodiment described with reference to FIGS. 1 to 5 and where appropriate the same reference numerals are used for the same or similar parts. In the second embodiment the pneumatic actuator comprises only two dividing elements, dividing element 66 fixed in relation to the torque ring 44 and dividing element 68 fixed to the carrier ring 54. In this embodiment the outer bearing race 36 and the carrier ring 54 are fixed to the rear duct casing 12 and the inner bearing race 34 and torque ring 44 are fixed to the upstream engine casing part 18. In all other respects the bearing ring assembly is constructed in accordance with the embodiment described with reference to FIGS. 1 to 5 such that the second embodiment operates in substantially the same way as the first embodiment.

In the second embodiment a twin-valve 120 is fixed to the outer torque ring 54 and is provided with inlet/outlet ports that pass through the torque ring and into the two divided regions of the chamber 52 on opposite sides of the dividing element 66 in a similar way to the arrangement in the drawing of FIG. 3 where the adaptor 76 is in flow communication with the region 80 on one side of the dividing element. In the second embodiment the twin-valve arrangement is adapted to provide an inlet/outlet port for each of the divided regions of the chamber so that pressurised air can be fed selectively into either region of the chamber in dependence on the required direction of rotation.

Figure 8:
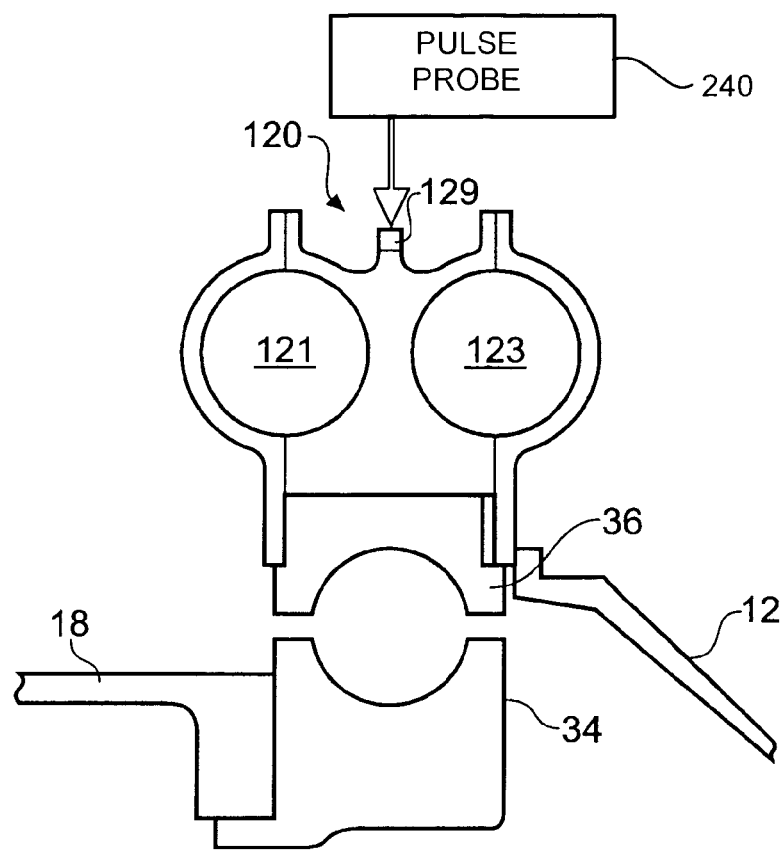
FIG. 8 is an axi-symmetric view similar to FIGS. 2 and 6 showing a bearing ring and actuation arrangement according to a third embodiment of the invention.
Figure 9:
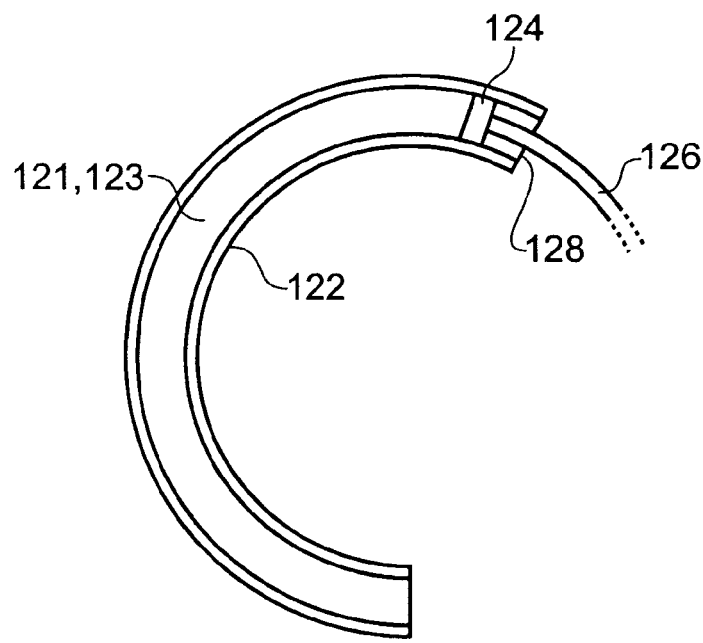
FIG. 9 is a cross-section view of the actuator of FIG. 8 similar to FIGS. 3 and 7 when viewed in the axial direction of the bearing ring.
Figure 10:
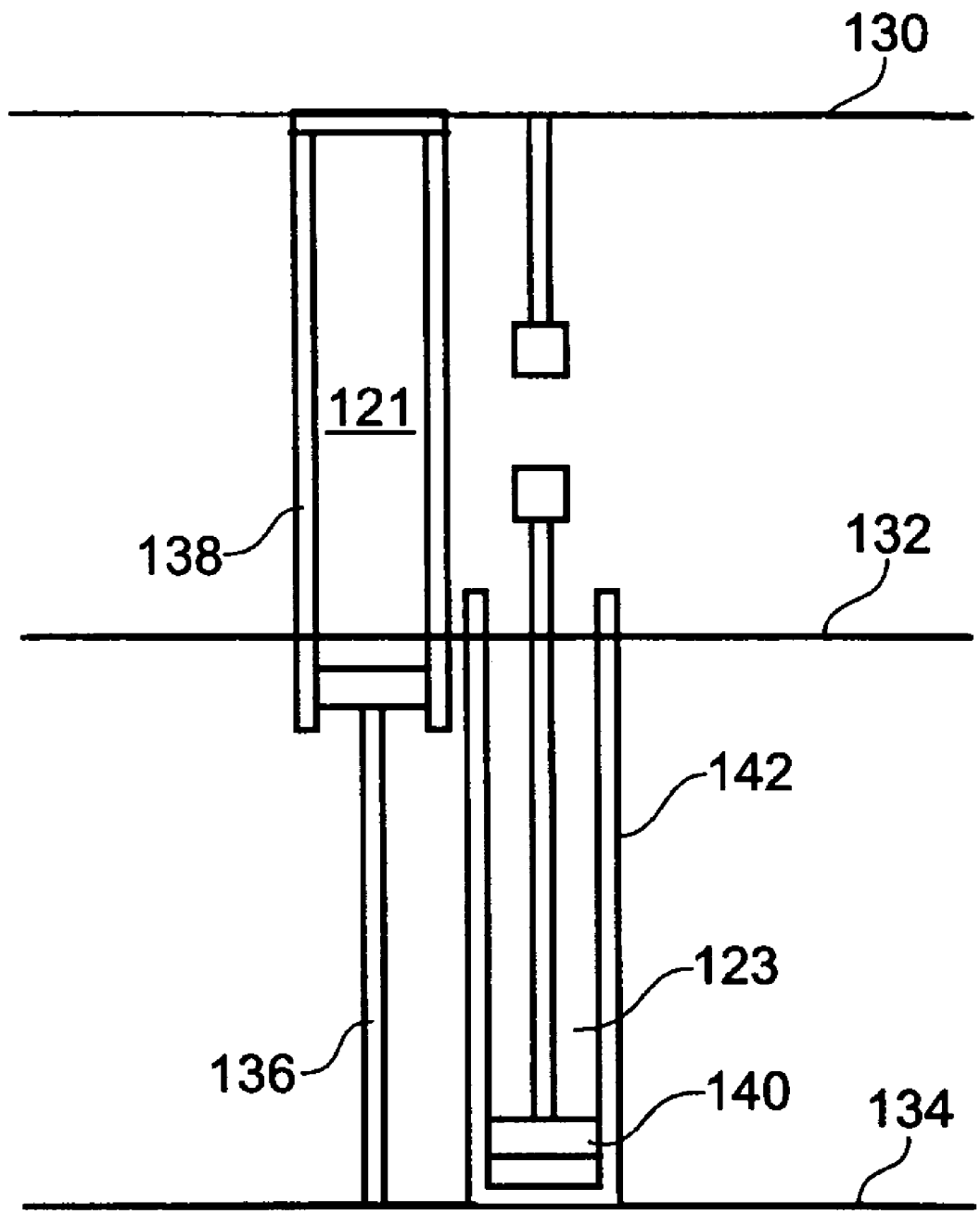
FIG. 10 is a developed view of the bearing actuator arrangement shown in FIGS. 8 and 9.

Referring now to FIGS. 8, 9 and 10 which show elements of a third embodiment of the invention. In this embodiment of the invention the final engine casing duct 18 is bolted to the inner race 34 of the bearing 30 and the first duct section 12 is bolted to the outer race 36 of the bearing. A pneumatic actuator 120 in the form of an arcuate circumferentially extending piston/cylinder type actuator is provided around the bearing assembly. As shown in FIG. 9 the cylinder 122 is in the form of a hollow half-torus, which in this embodiment extends around the bearing circumference by just over 180°, for example 200°. The toroidal cylinder 122 is fixed to the outer bearing race 36 as shown in the drawing of FIG. 8. In the embodiment shown the half-torus comprises a pair of circular cross-section circumferentially extending cylindrical bores 121 and 123, each for receiving a double-acting piston 124 therein. Each piston is connected to an arcuate tubular conrod 126 which fits into the bore of the cylinder 122 through the open end 128 thereof. The tubular conrod 126 may have a cruciform cross-section web for increased stiffness and strength to enable the conrod to be provided with a hollow bore for supplying engine compressor or bypass air through the conrod into the bore of the cylinder to move the piston within the cylinder to effect rotation of the relatively rotatable moving parts 12 and 18 that are fixed to the respective bearing parts. The twin bore actuator shown in the drawing of FIG. 8 is provided for forward and reverse operation in the sense that one of the cylinder bores is provided for rotation in one direction and the other cylinder bore for rotation in opposite direction. In this embodiment the respective conrods 1 to 6 are fixed in relation to the inner bearing race 34 and the final engine casing duct 18. In this respect the respective cylinders are arranged substantially on opposite sides of the bearing ring, that is to say they occupy different regions of the bearing ring circumference overlapping slightly at their respective ends.

An outer gear 129 is provided on the radially outer part of the half-torus. The outer gear provides a ferric gear which is measured by a pulse probe 240 (FIG. 8) to determine the absolute and relative rotational velocity of the rotating components. The outer gear 129 may also be used for hand cranking purposes in the event of actuator failure, that is to say for manually cranking the duct sections of the nozzle to the required configuration. In embodiments where more than 180° of rotation is required the conrods 126 are capable of small degrees of rotation in the same direction as the half-torus. This is readily achieved by the use of double-acting pistons in both cylinder bores. In another embodiment a single cylinder is provided in which the bore defines a helical path around the bearing assembly. In this way it is possible for the actuator to provide the same degree of rotation in both directions with limited conrod deflection.

FIG. 10 shows, in a developed view on the engine, the respective positions of the twin actuators of the embodiment of FIGS. 8 to 10. The three horizontal lines in the drawing define the bottom dead centre (BDC) position 130, the top dead centre position (TDC) 132, and the bottom dead centre position 134. In the developed view the lines 130 and 134 both represent the same angular position about the bearing ring assembly. In the position shown the first conrod 136 is fully extended from the bore 121 of the first cylinder 138. In this position the second piston 140 is fully retracted within the bore 123 of the second cylinder 142 and is positioned substantially at the bottom dead centre position of the bearing ring assembly. It is to be understood that in this arrangement as the first piston 136 is retracted into the cylinder 138 the second piston 140 is moved towards the open end of the second cylinder 142. In this way bi-directional rotation of the bearing elements is readily achieved.

Although aspects of the invention have been described with reference to the embodiments shown in the accompanying drawings, it is to be understood that the invention is not limited to those precise embodiments and that various changes and modifications may be effected without further exercise of inventive skill and effort. For example, the present invention also contemplates embodiments where the actuator arrangement is used in other technical fields, for example to provide an actuator arrangement for moving gun turrets and the like, in vehicle steering systems or any other application where actuation of relatively rotatable components is required.

The invention claimed is:

1. A vectorable nozzle assembly for a gas turbine engine, comprising:
   bearing means including first and second relatively rotatable bearing elements for mounting respective first and second rotatable components for relative rotation about a common axis;
   pneumatic or hydraulic actuator means having a pair of co-acting annular members, including a first annular member fixed with respect to the said first rotatable component and the first bearing element, and a second annular member fixed with respect to the said second rotatable component and the second bearing element; and
   means for energising and/or de-energising said actuator means to effect movement of the said co-acting annular member and thereby relative rotation of the said first and second bearing elements about the said bearing axis wherein the said actuator means comprises at least one chamber defined between the pair of relatively rotatable annular members each having at least one dividing element extending into the chamber to divide the interior of the chamber into separate circumferential regions, and means for generating a pressure differential in said chamber across one or more of the said dividing elements to effect said relative rotation of the said first and second bearing elements.

2. The vectorable nozzle assembly as claimed in claim 1, wherein the said first annular member comprises a pair of circumferentially spaced dividing elements and the said second annular member comprises a single dividing element, whereby the said single dividing element is movable relatively between the said two dividing elements of the said first annular member.

3. The vectorable nozzle assembly as claimed in claim 1, further comprising a plurality of inlet/outlet ports for delivering and/or venting pressurised fluid to/from a selective circumferential region or regions of the said chamber.

4. The vectorable nozzle assembly as claimed in claim 3, wherein the said ports are each located adjacent to and in fixed relation to a respective dividing element such that pressurised fluid is capable of being delivered/vented from each of said regions independently of the relative rotational position of the said dividing element(s).

5. The vectorable nozzle assembly as claimed in claim 3, wherein the said ports are provided in the said first and second annular members.

6. The vectorable nozzle assembly as claimed in claim 1, wherein the said chamber is defined by an open annular channel in one of the said annular members and an annular cover part of the other of the said annular members.

7. The vectorable nozzle assembly as claimed in claim 1, wherein the said dividing element(s) is/are each provided with a tip seal for sealing engagement with an adjacent surface of the said chamber.

8. The vectorable nozzle assembly as claimed in claim 1, further comprising a controller that controls absolute and relative rotational velocities of the rotatable elements.

9. The vectorable nozzle assembly as claimed in claim 8, wherein the controller includes a pulse probe that measures the rotational velocities of the rotatable elements.

10. The vectorable nozzle assembly as claimed in claim 8, wherein the controller includes a phonic wheel and solenoid controlled brakes to control the rotational velocities.

11. The vectorable nozzle assembly as claimed in claim 1, wherein the said bearing means comprises a rolling element type bearing having an inner race and an outer race and wherein said first and second rotatable components comprise said inner and outer races.

12. The vectorable nozzle assembly as claimed in claim 1, wherein the components comprise relatively rotatable nozzle sections of a gas turbine engine vectorable nozzle.

13. The vectorable nozzle assembly as claimed in claim 1, wherein the said means for energising and de-energising the said actuator comprises a pneumatic or hydraulic circuit comprising a valve for reversing the direction of the pressure differential in the said circuit.

14. The vectorable nozzle assembly according to claim 1, wherein the said nozzle comprises at least three relatively rotatable nozzle duct sections.

15. A vectorable nozzle assembly for a gas turbine engine, comprising:
   an upstream duct section;
   a downstream duct section; and
   a bearing ring assembly connecting the upstream and downstream duct sections, the bearing assembly including:
      a rolling bearing element that includes inner and outer bearing races and spherical rolling elements between the inner and outer bearing races,
      first and second annular members that are each connected to one of the upstream and downstream duct sections and one of the inner and outer bearing races, the first and second annular members defining a circumferentially extending chamber therebetween,
      at least one dividing element that divides the chamber into separate regions, and
      an actuator that generates a pressure differential between the regions of the chamber to effect relative rotation of the first and second annular members and thereby relative rotation of the inner and outer races.

16. The vectorable nozzle assembly according to claim 8, wherein the controller includes a pinion gear that meshes with corresponding gear teeth of an outer gear, the outer gear being connected to one of the first and second annular members.

\* \* \* \* \*